United States Patent [19]

Woolman et al.

[11] 3,985,321

[45] Oct. 12, 1976

[54] AUTOMATIC LINE RELEASE SYSTEM

[75] Inventors: Raymond D. Woolman; Warren N. Massey, both of El Centro, Calif.

[73] Assignee: The United States of America as represented by the Secretary of the Air Force, Washington, D.C.

[22] Filed: Nov. 25, 1975

[21] Appl. No.: 635,192

[52] U.S. Cl. ................................................ 244/150
[51] Int. Cl.² ........................................ B64D 21/00
[58] Field of Search ............... 244/147, 150, 151 B, 244/138 R; 294/83 A; 114/221 A; 73/15.4; 219/68; 89/1 B; 102/24 M

[56] References Cited
UNITED STATES PATENTS
2,768,802  10/1956  De Jean .......................... 89/1 B X Primary Examiner—Trygve M. Blix
Assistant Examiner—Barry L. Kelmachter
Attorney, Agent, or Firm—Joseph E. Rusz; Jacob N. Erlich

[57] ABSTRACT

An automatic line release system for severing parachute suspension lines at a pre-set time in order to evaluate parachute performance under controlled conditions. The line release system utilizes an electronic timer and switching circuit to energize strands of wire ("burn" wire) wrapped about the desired suspension lines at a point near the riser connector links to burn through the lines and thereby release them.

10 Claims, 4 Drawing Figures

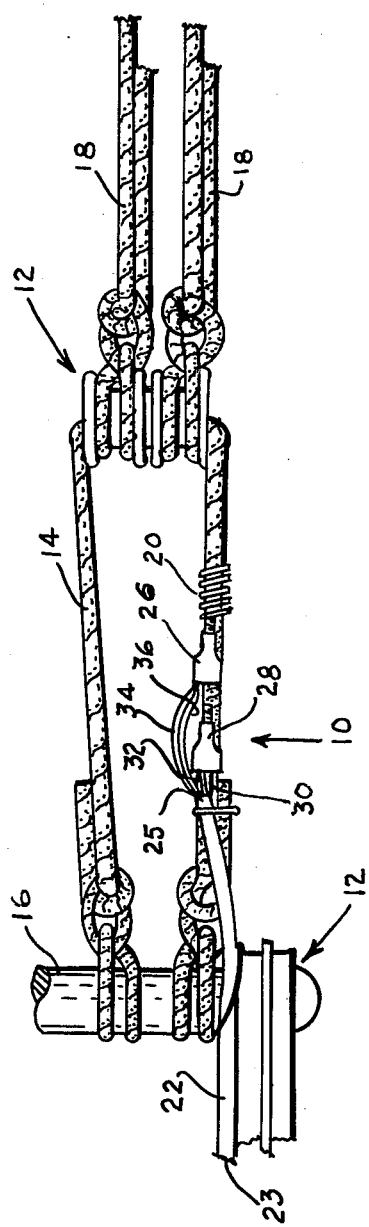
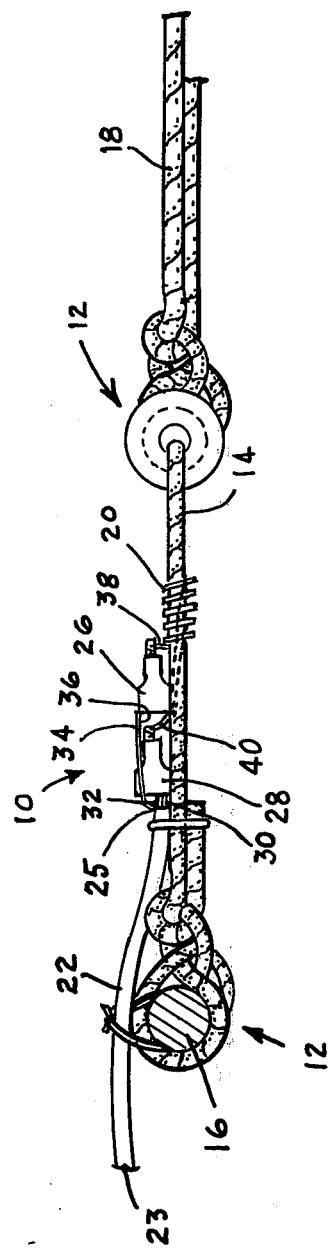

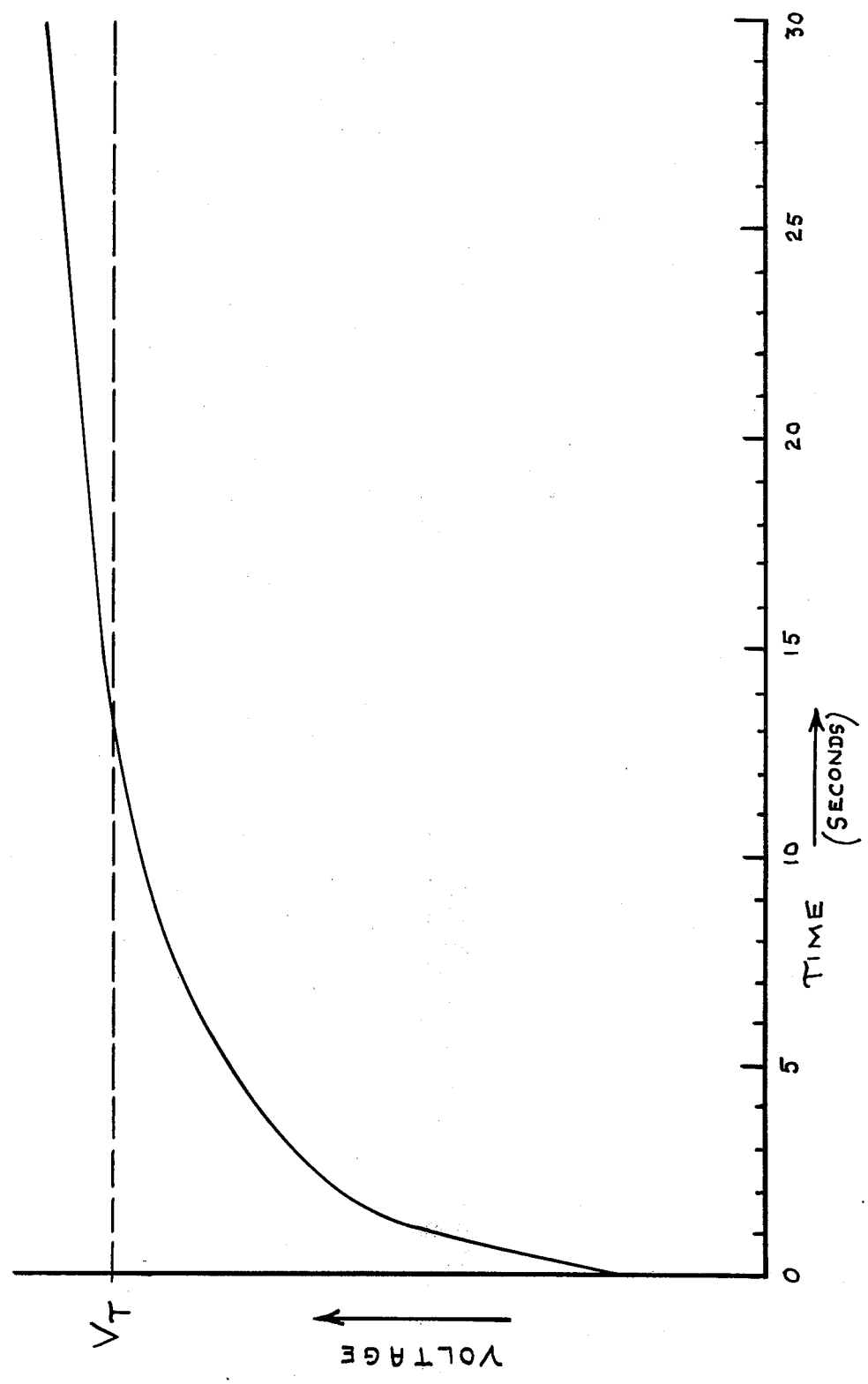

3,985,321

AUTOMATIC LINE RELEASE SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to line or cable cutters, and, more particularly, to an automatic electrical line release system.

There are many instances wherein it is necessary to sever lines or cables at predetermined times. For example, line release systems find applicability in the release of drogue parachutes, the timed release of the canopy of a parachute, the actuation of parachute safety lines and in particular in the testing of a personnel parachute.

One of the basic requirements of personnel parachute testing apparatus is to simulate, as close as possible, the conditions the system will be exposed to in operational use. Many of these conditions are manually initiated by the parachutist during descent. One of these manually initiated conditions is commonly referred to as the four-line release. Four adjacent canopy suspension lines are released simultaneously. The four-line release serves two vital functions: (a) it greatly reduces canopy oscillation, and (b) it imparts a degree of directional control to the canopy enabling the parachutist to guide himself and avoid hazards at ground impact.

During testing, it is of vital importance to monitor the parachute performance prior to, during, and following a four-line release. For obvious reasons of personnel safety, the majority of personnel parachute testing is conducted using either torso or articulated dummies to simulate a live parachutist. The use or dummies, however, requires a means of simulating a four-line release.

Two methods have been used in the past: (1) Complete removal of the selected suspension lines prior to packing the parachute, and (2) Cutting the suspension lines during descent with time-delayed reefing line cutters. Both of these methods have serious limitations. In the first method, when a portion of the suspension system is not connected during the critical phases of canopy deployment and inflation, serious delays can be encountered which could cause severe canopy damage, damage or loss of the dummy, and seriously degrade the value of the test data. In the second method, a high cost is incurred in using reefing line cutters which are a one-time use item. The bulk which the cutters add to the suspension system induces an element into the test system which would not be present in an operational configuration. This additional bulk could adversely affect the overall performance of the system under test.

It is therefore essential to provide a line cutting system which is not only highly reliable in operation, but which also enables specific performance parameters to be measured, is reusable, and has a minimal initial and inservice cost.

SUMMARY OF THE INVENTION

The instant invention sets forth an electrical line release system which utilizes a "burn" wire for releasing a plurality of suspension lines at a predetermined time and in so doing overcomes the problems set forth in detail hereinabove.

The automatic line release system of this invention simulates the manual release of single or multiple suspension lines at a preset time, for example, following canopy inflation or the like. This procedure is accomplished by energizing strands of wire (burn wire) which heat and thereby burn through the suspension lines at a point near the riser connector links. A resistance-capacitance (RC) timing circuit provides a set time delay prior to the energizing of the burn wire. The timer is armed at a predetermined time during canopy line stretch while the entire system is powered by an external electrical power supply such as a battery.

In the operation of the instant invention a mechanical switch is closed permitting the application of power to a timer and electronic switch circuit. The timer, after a fixed period of time, triggers the electronic switch which directly shorts the burn wires across the battery. The burn wires get hot, melt the cord around which they are wrapped and then burn themselves in two. In so doing an extremely reliable and efficient automatic line release system is produced.

It is therefore an object of this invention to provide an automatic line release system which is electrical in nature and thereby eliminates the destruction of elements which are to remain intact during the line severing operation.

It is another object of this invention to provide an automatic line release system which can be adapted for use with any number of lines or cables.

It is still another object of this invention to provide an automatic line release system which is reusable.

It is a further object of this invention to provide an automatic line release system which allows measurement of specific performance parameters before, during and after line release.

It is still a further object of this invention to provide an automatic line release system which is highly reliable in operation, economical to produce and which utilizes conventional, currently available components that lend themselves to standard mass producing manufacturing techniques.

For a better understanding of the present invention together with other and further objects thereof, reference is made to the following description taken in conjunction with the accompanying drawing and its scope will be pointed out in the appended claims.

DESCRIPTION OF THE DRAWING

FIG. 1 is a side elevational view of the automatic line release system of this invention;

FIG. 2 is a plan view of the automatic line release system of this invention;

FIG. 4 is a graph representing the rate of change of the voltage on a capacitor in the automatic line release system of this invention.

DETAILED DESCRIPTION OF THE PREFERRED EMBODIMENT

Figure 3:
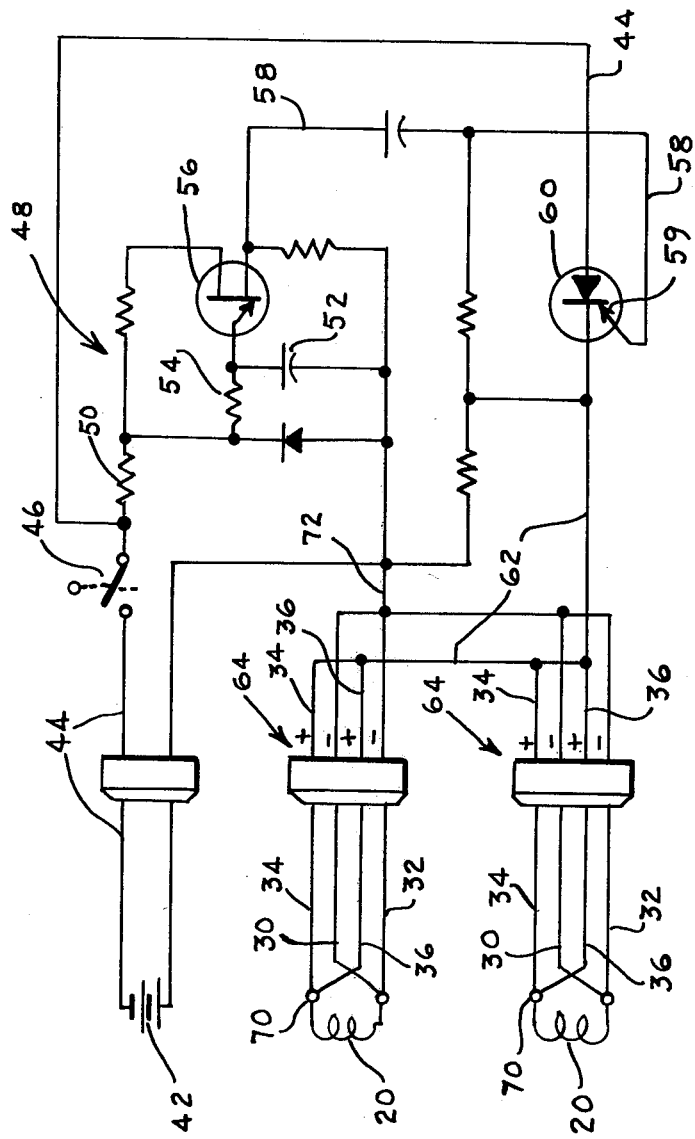
FIG. 3 is a schematic diagram of the electrical circit of the automatic line release system of this invention.

Reference is now made to FIGS. 1 and 2 of the drawing which best illustrate the burn wire automatic line release system 10 of this invention. The automatic line release system 10 of this invention is shown in conjunction with any conventional parachute line assembly 12, however, this invention can be adapted for use with any other line to be severed at a predetermined time.

Parachute assembly 12 formed of at least one looped nylon cord 14 which is secured at one end thereof to a connector link 16 and at the other end thereof to canopy suspension lines 18. The burn wire 20 of automatic line release system 10 is of high resistance and approximately 0.015 inches in diameter. The exact mounting of burn wire 20 upon cord 14 will be described in detail hereinbelow. Although only one such burn wire 20 and one cord 14 are shown in the drawing it should be realized that the instant invention is capable of operation for any number of line releases.

Still referring to FIGS. 1 and 2 of the drawing any suitable electrical connector such as electrical cable 22 is connected at one end 23 to the electrical timer and switch circuit 24 in the manner to be set forth hereinbelow and as shown in FIG. 3, and, at the other end 25 to a pair of conventional terminal ends 26 and 28. Within cable 22 are four electrical wires 30, 32, 34 and 36, two of which, 34 and 36, being connected to terminal end 26 and the other two, 30 and 32 being connected to terminal end 28. The burn wire 20 is connected at one end 38 to terminal end 26 and is wound five turns about cord 14, is embedded within cord 14 exiting at a position adjacent terminal end 28 and secured thereto at end 40. In this manner a complete electrical circuit is produced. Any suitable securing method, such as taping or the like can be utilized to secure cable 22 and terminal ends 26 and 28 to connector link 16 and cord 14, respectively.

Reference is now made to FIG. 3 of the drawing. Power is supplied to the automatic line release system 10 of this invention by any suitable power source such as battery 42. The positive (+) side of battery 42 supplies power through line 44 to a mechanical switch 46 which is shown in the open or off position in the drawing. When switch 46 is closed (turned on), power is supplied to a conventional electronic timer circuit 48 thru resistor 50. At this instant in time capacitor 52 starts charging and the rate of charge is determined by the value of resistance of resistor 54. A large resistance causes a long charge time and a small resistance causes a short charge time. This is the manner in which the time delay of the instant invention is varied. This charging action is graphically shown in FIG. 4.

At some later time the voltage on capacitor 54 reaches a point that causes transistor 56 to turn on (it has been off up to this point). This is called the trigger voltage ($V_T$). When transistor 56 turns on, it applies power thru wire 58 to the trigger 59 of electronic switch 60 which in this case is a silicon controlled rectifier.

Going back to switch 46, when switch 46 is closed and power is applied to the timer circuit 48, power is also applied thru wire 44 to the right side of electronic switch 60 which at that time is off. Later, as the power is applied to the trigger of switch 60, it turns on and the electric current goes from wire 44 out wire 62.

Wire 62 then splits up into a plurality of risers or burn wire units 64, two of which being shown in FIG. 3 of the drawing. It should be noted that although two such units 64 are shown any number may be utilized with this invention. Within each burn wire unit 64, cable 62 splits up into two wires 34 and 36 to provide a dual circuit in case one of the wires fails or breaks. These two wires 34 and 36 of each burn wire unit 64 form two of the wires of the four wire cable 22 (only one of these cables 22 being shown in FIGS. 1 and 2). Wires 34 and 36 then proceed onto the burn wire 20 located beyond connector link 16. At this point wires 34 and 36 are joined together at 70 (FIG. 3) and are connected through terminal end 26 to end 38 of burn wire 20.

The electric current continues through burn wire 20 which heats up thereby burning through cord 14. The current then proceeds back to the timer and switch circuit 24 through the other two wires 30 and 32 of four wire cable 22. Wires 30 and 32 join together to form wire 72 beyond burn wire units 64 and are eventually connected to the negative side of power source 42. The remaining components of circuit 24 are conventional in operation and therefore require no additional explanation.

Although this invention has been described with reference to a particular embodiment it will be understood to those skilled in the art that this invention is also capable of a variety of alternate embodiments within the spirit and scope of the appended claims.

We claim:
1. An automatic electrical line release system comprising an electrical cable located adjacent a line to be severed, said cable containing four wires therein, two of said wires being joined together at a first terminal end, the other pair of said wires being joined together at a second terminal end, a high resistance wire surrounding said line to be severed, said high resistance wire being connected at one end to said first terminal end and at the other end thereof to said second terminal, means for providing power to said line release system and means connected between said power supplying means and said four wire cable for energizing said line release system at a predetermined time.

2. An automatic electrical line release system as defined in claim 1 wherein said high resistance wire is wrapped around said line a plurality of times adjacent said first terminal end and is embedded within said line exiting adjacent said second terminal end.

3. An automatic electrical line release system as defined in claim 2 wherein said means for energizing said line release system is a timing and switching circuit.

4. An automatic electrical line release system as defined in claim 3 further comprising a switch connected between said power supplying means and said timing and switching circuit.

5. An automatic electrical line release system as defined in claim 4 wherein said timing portion of said circuit comprises a capacitor, resistor and transistor operatively connected together.

6. An automatic electrical line release system as defined in claim 5 wherein said switching portion of said circuit comprises silicon controlled rectifier.

7. An automatic electrical line release system as defined in claim 6 wherein said high resistance wire is wrapped about said line five times before being embedded within said line.

8. An automatic electrical line release system as defined in claim 7 wherein said line to be severed is the suspension line of a parachute.

9. An automatic electrical line release system as defined in claim 8 comprising a plurality of four line cables and high resistance wires.

10. An automatic electrical line release system as defined in claim 8 wherein said parachute suspension line is made of nylon.

* * * * *